Oct. 19, 1965   L. PERAS   3,212,460
BOGEY SECONDARY SUSPENSIONS
Filed April 10, 1961

Inventor
Lucien Peras
By Stevens Davis Miller & Mosher
Attorneys

United States Patent Office 3,212,460
Patented Oct. 19, 1965

3,212,460
BOGEY SECONDARY SUSPENSIONS
Lucien Peras, Billancourt, Seine, France, assignor to Regie Nationale des Usines Renault, Billancourt, France
Filed Apr. 10, 1961, Ser. No. 101,783
Claims priority, application France, Apr. 22, 1960, 825,058, Patent 1,262,730
3 Claims. (Cl. 105—453)

The present invention relates to a bogey suspension of a railway vehicle, and more particularly to what may conveniently be termed the secondary suspension, that is to say the suspension provided between the bogey chassis and the body of the vehicle. The primary suspension is generally that provided between the wheel axles and the bogey chassis.

The invention relates to a secondary suspension of the kind in which the body rests in frictional engagement on side supports which lie in a plane parallel to the bogey chassis and which are coupled to the bogey chassis with the interposition of an elastic suspension system, the body being additionally provided with a pivot coupling to the bogey chassis which is not subject to the load of the vehicle. In a suspension of this kind, it is known that the pivot coupling above-mentioned particularly permits the free orientation, or movements of the bogey in the horizontal plane, necessary of the bogey with respect to the body, which is also permitted by the lateral supports referred to above, an additional function of which is to damp-out frictionally the oscillating movements which may be imparted to the bogey.

In addition, the body also makes its own oscillations which must be damped and especially vertical oscillations together with a rolling movement, against which independent damping devices have been provided up to the present time.

The invention is precisely directed to a new and simple arrangement of the secondary suspension of the bogey, especially adapted to cause the lateral supports to participate, not only in damping out the horizontal oscillations, but also in the damping of the oscillations of the body.

To this end, the secondary suspension according to the invention is essentially characterized in that each lateral support is carried by an arm oscillating about a shaft carried by the bogey and arranged at a position relatively close to the said lateral support so that, during oscillations of the body, these lateral supports participate in the damping of the said oscillations, by friction with the body.

In addition, an arrangement of this kind lends itself to an advantageous and preferred construction, in which the oscillating arms carrying the lateral supports are mounted on a common shaft arranged transversely to the bogey and constituted by a stabilizing torsion bar with which the arms are rigidly fixed for rotation.

Finally, and especially in order to contribute in obtaining a better damping of the rolling movement by means of the lateral supports, the invention provides for this arrangement, the mounting of the pivot coupling at a point on the bogey chassis below the plane of the supports.

One form of preferred construction of a secondary bogey suspension according to the invention will now be described with reference to the accompanying drawings, in which.

Figure 1:
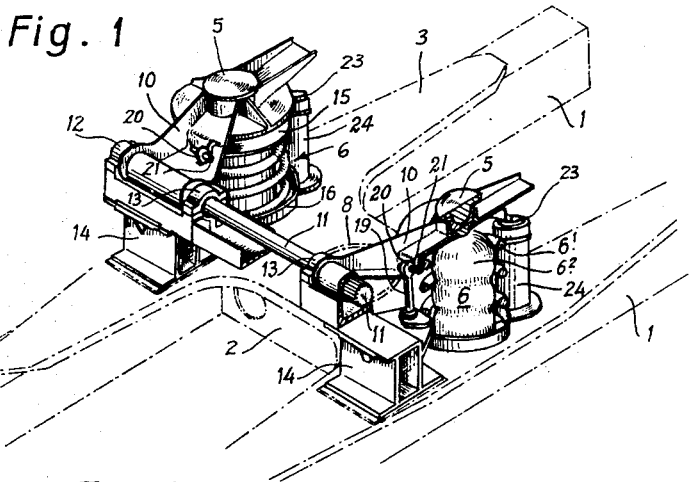
FIG. 1 is a view in perspective of the secondary suspension in question with a partial cross-section along the longitudinal axis of one of the oscillating arms.

Referring now to FIG. 1, there can be seen the whole of the secondary suspension mounted on a bogey chassis shown diagrammatically in chain-dotted lines and comprising two longitudinal girders 1 and a central cross-member 2 which supports a base-plate 3.

Figure 2:
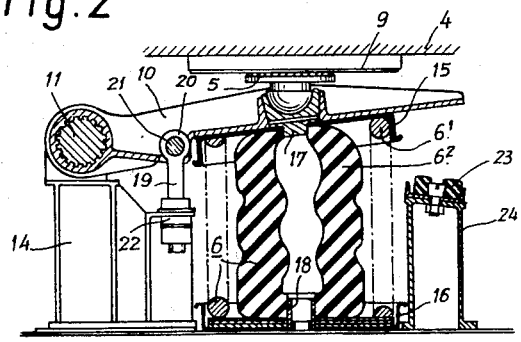
FIG. 2 is a view in elevation with longitudinal cross-section of an elastic suspension of this kind.
Figure 3:
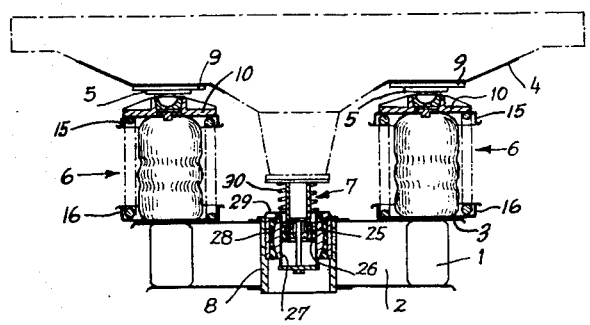
FIG. 3 is a transverse cross-section of this suspension, passing through the axis of the bogey pivot.

The body of the vehicle, shown diagrammatically at 4 in FIGS. 2 and 3, rests on two lateral supports 5, each carried by an elastic suspension system 6 supported on the bogey chassis. Between this latter and the body is provided a pivot-coupling 7, mounted in a vertical sleeve 8 carried by the central cross-member 2 of the chassis.

This body rests on the supports 5 forming friction shoes through the intermediary of co-operating plates 9 fixed under the body, the dimensions of which take account of the relative movements to be provided for between the body and the bogey. The shoes 5 are mounted with a swivel joint on their support following a known arrangement.

In accordance with a characteristic feature of the invention, each shoe 5 is supported by an oscillating arm 10 mounted on a shaft 11 carried by the chassis, the length of this arm 10 between the shaft 11 and the shoe 5 being so that vertical oscillations of the suspension system is permitted in response to oscillations of the body acting thereon. This length can be appreciated from FIG. 2 with respect to the elongation of the elastic suspension system 6. The result is that any movement of the body involving a variation in length of the elastic system 6 will produce friction of these shoes in contact with the body, due to the fact that the shoes 5 are then caused to describe an arc of a circle which results in a horizontal component of friction which, in turn, serves to damp-out the oscillations in question.

This arrangement lends itself in addition to the advantageous construction shown here, which consists in mounting the arms 10 on a common shaft 11, transverse to the bogey and constituted by a stabilizing torsion-bar. The arms 10 are rigidly mounted for rotation with this bar at its extremities, in this case by the engagement of corresponding splines shown in FIGS. 1 and 2. In addition, at each extremity, this bar pivots in bearings 12 and 13, provided on each side of each arm 10, and the lower members of which are coupled to the bogey chassis through the intermediary of supports 14.

According to this arrangement, the mounting bar for the arms 10 carries out a known stabilizing function against tilting movements, due to the fact that, without opposing the lateral inclination of the body, it will limit such movement however by tending to cause the elastic lateral suspension systems to work in the same manner. Each of these latter is in this case constituted by a mixed assembly composed of a coiled spring $6^1$ and a rubber spring $6^2$. Each coil spring $6^1$ is supported in cups 15 and 16 respectively, rigidly fixed to the arms 10 and to the bogey chassis. In the interior of the springs $6^1$ are housed the springs $6^2$ in the general shape of the sleeves, centered at their extremities by engaging with tenons 17 and 18. It will be understood that within the scope of the invention, the elastic suspension system employed may be of any particular type.

In the same way, it is not essential that the suspension system should be located exactly under the corresponding lateral support shoe 5, since it may be placed at any point on the length of the arm 10, it being understood that it is the proximity of the shoe and the shaft of the arm which is important.

In the example shown, taking account of the position and of the unladen height of the elastic system 6 under each arm 10, with a view of facilitating the mounting in position of the body on the bogey during the erection of the assembly, there is provided a device for restraining each arm 10 from rising above a preselected position from the elastic system 6 in the absence of a load.

In the present case this device is constituted by a shaft 19 with an eye 20, the eye passing through a slot in the arm 10 and receiving a retaining pin 21 thereby fixing it in the arm 10, the shaft 19 being engaged at its lower part in a boss 22 formed on the support 14. This shaft 19 oscillates vertically with respect to support 14 and is adjustable in height by screwing its lower threaded portion in the boss 22.

On the other hand, it can be seen that the downward movement of each suspension assembly is limited by an elastic stop 23 fixed on a support 24 rigidly fixed to the bogey, and with which co-operates an extension of the arms 10.

The pivot coupling 7 which is not subject to the load of the vehicle is shown in detail in FIG. 3 and is of a known type which is briefly described below. The pivot 7 fixed to the body carries a swivel-joint 25 surrounded by an outer ring 26 slidably-mounted in a jacket 27 which is closed at its lower portion to form an oil-bath. This jacket is mounted in the sleeve 8 fixed to the bogey, with the interposition of a sleeve comprising a ring 28 of elastic material which permits a certain play in this pivot coupling between the body and the bogey. Member 29 is mounted on sleeve 8 and supports a spring 30 mounted between member 29 and the body. A more detailed description of the pivot may be found in applicant's U.S. Patent No. 3,010,411.

With a suspension of this kind, it has already been seen that a damping action of the movements of the body itself is generated by a friction of the shoes 5 in contact with it. This applies both to the vertical oscillations and to the rolling oscillations from the moment when the elastic suspension system varies in length.

In addition, in the case of rolling movements, a better damping can be obtained by reinforcing the above effect by the adoption of a low position for the pivot coupling with respect to the plane of the shoes 5 (see FIG. 3).

In fact, in the case of rolling movements, the points of the body describe circular arcs having their centers on the center line of the swivel bearing of the bogey pivots and taking account of the different downward movements of the two elastic suspension systems in this case, there is obtained a friction in the transverse sense between the body and the shoe 5 as discussed above, and an increased damping due to the adoption of the low position of the pivots.

Finally, it is clear from a study of the various possible movements of the body and the bogey in combination, that the friction stresses between the shoes and the body cannot in any case cancel out, and there is obtained with this arrangement a constantly effective damping.

I claim:

1. A suspension system for mounting on the chassis of a vehicle to support a body thereon, said system comprising:
    (a) a transverse shaft rotatably mounted on said chassis;
    (b) a pair of arms rigidly mounted at right angles to said shaft to oscillate upon rotation thereof;
    (c) a body support member universally coupled to the upper portion of said arms;
    (d) bearing means disposed on the upper portion of each of said support members to provide a frictional engagement between the body and the support members;
    (e) a resilient suspension means interposed between the chassis and the lower portion of each of said arms;
    (f) a body coupling member extending below the plane of said support members and universally pivoted to the chassis;
    (g) and spring means disposed on said coupling member and urging said body away from said chassis.

2. The system of claim 1 wherein each of said arms extend in the same direction from said shaft.

3. The system of claim 1 further comprising means to limit the oscillatory movement of said arms.

References Cited by the Examiner

UNITED STATES PATENTS

| 2,530,495 | 11/50 | Waldvogel | 105—199 |
| 2,819,893 | 1/58 | Edwards | 267—20 X |
| 2,934,028 | 4/60 | Travilla | 105—199 |
| 2,954,747 | 10/60 | Hirst et al. | 105—453 |
| 2,958,297 | 11/60 | Broberg | 105—453 |
| 3,010,411 | 11/61 | Peras | 105—215 |
| 3,027,177 | 3/62 | Karlstad | 267—67 X |

FOREIGN PATENTS 1,155,120  11/57  France.

ARTHUR L. LA POINT, *Primary Examiner.*

JAMES S. SHANK, LEO QUACKENBUSH, *Examiners.*